Figure 1:
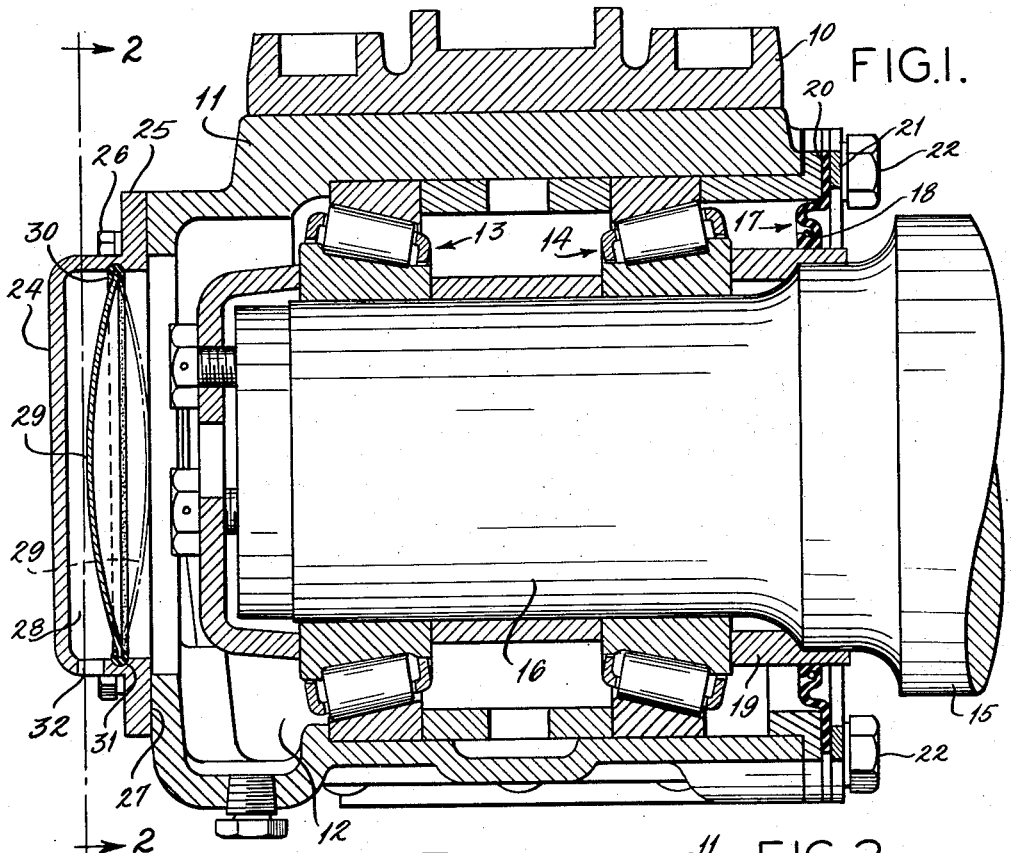

April 20, 1954 E. G. BODEN 2,676,073
BREATHER FOR SEALED AXLE BEARING MOUNTINGS
Filed March 5, 1951 2 Sheets-Sheet 1

INVENTOR:
ERNEST G. BODEN
By Carr & Carr & Gravely
ATTORNEYS.

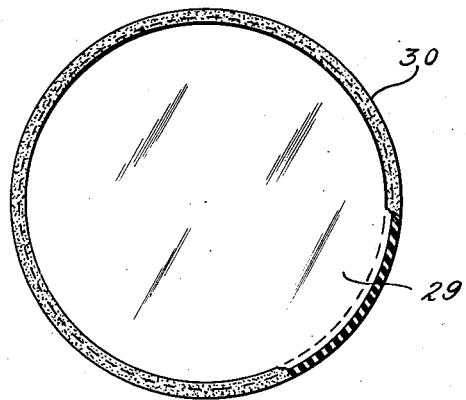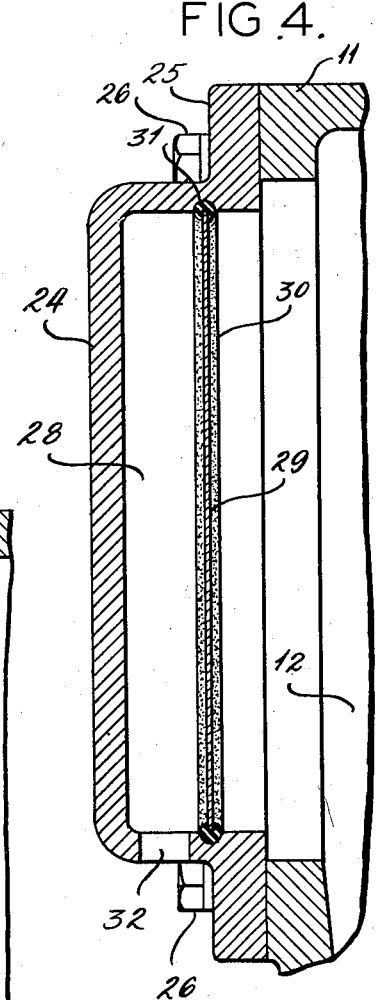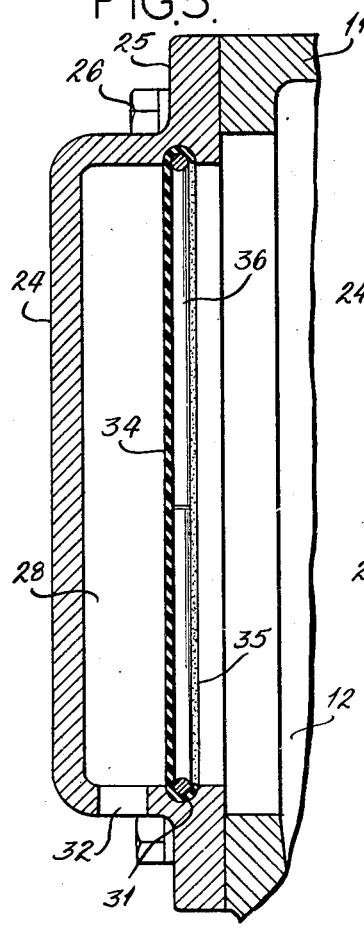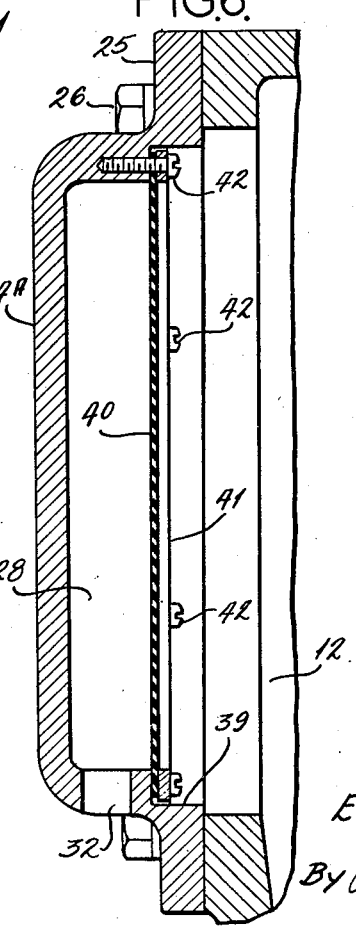

Patented Apr. 20, 1954

2,676,073

UNITED STATES PATENT OFFICE

2,676,073

BREATHER FOR SEALED AXLE BEARING MOUNTINGS

Ernest G. Boden, Canton, Ohio, assignor to The Timken Roller Bearing Company, Canton, Ohio, a corporation of Ohio Application March 5, 1951, Serial No. 213,812

7 Claims. (Cl. 308—180)

This invention relates to shaft or axle bearing mountings of sealed type, and is particularly concerned with improvements in the sealing provisions for railway car axle bearing mountings.

An object of the present invention is to provide a bearing mounting seal arranged to prevent the loss of lubricant and the contamination of such lubricant, due to changes in the pressure existing within the bearing chamber as a result of changes in the temperature of the bearing mounting.

It is also an object of this invention to provide a simple bearing mounting closure and seal which will be responsive to changing internal pressure conditions for carrying out the above stated object.

The invention consists in a sealed bearing mounting having a housing providing a lubricant chamber, a shaft or axle extending into the housing for support on a bearing therein, sealing means surrounding the shaft or axle at one end of the housing, and a pressure responsive closure means for another opening in the housing whereby pressure differences developing in the housing chamber will be compensated by said closure means, so that the lubricant seal surrounding the shaft or axle will not be caused to move in such a way as to result in contamination and loss of lubricant.

The invention further consists in the provision of a closure means for a railway car axle bearing housing comprising a cap defining a space adjacent the housing chamber and a flexible diaphram carried by the cap and separating the housing chamber from the space in the cap, the cap being provided with a breather opening to atmosphere so that the flexible diaphragm may accurately reflect the pressure differential between the housing chamber and the cap space.

The invention further consists in the parts, and the combination of parts and their arrangement as herein particularly described and claimed in connection with the drawings.

Figure 2:
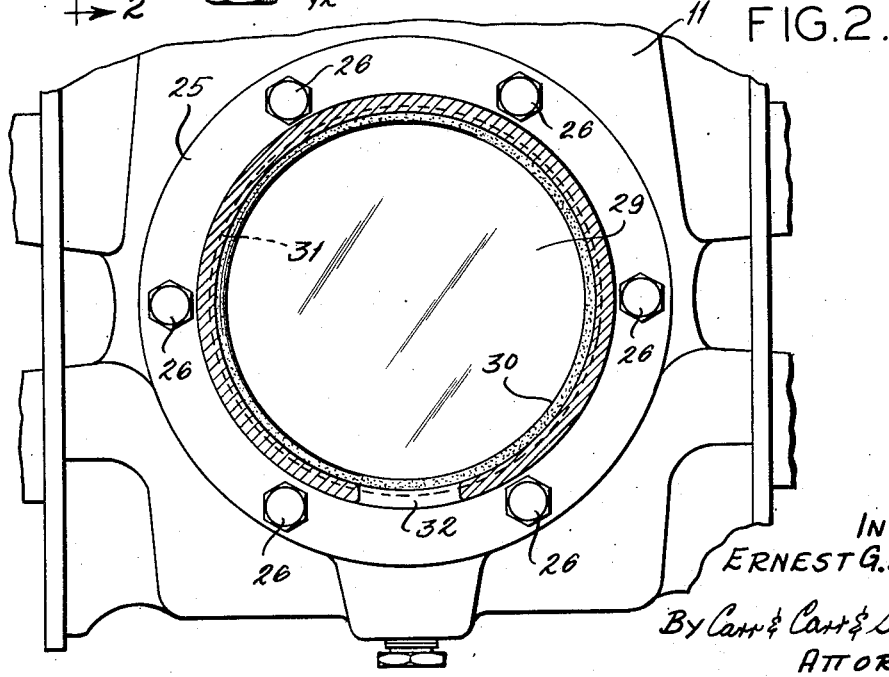

In the drawings:

Fig. 1 is a longitudinal sectional elevation of a typical railway car axle bearing mounting disclosing the details of the present improvements, Fig. 2 is a fragmentary end elevational view showing the improved closure means in sectional elevation along the line 2—2 of Fig. 1, Fig. 3 is an elevational view of a preferred flexible diaphragm used in connection with the closure means, and diaphragm mounting ring being partly broken away to show its detail, Fig. 4 is a fragmentary and greatly enlarged sectional detail of the preferred breather diaphragm mounting arrangement, this view being similar to that of Fig. 1, and Figs. 5 and 6 are fragmentary sectional elevational views similar to Fig. 4, disclosing modifications relative to the type and the mounting of flexible diaphragms, Fig. 5 illustrating the application of a resilient split ring with a rubber diaphragm and Fig. 6 disclosing a diaphragm mounting and backing ring held by means of threaded fasteners.

The present invention is disclosed in connection with a railway car side frame 10 suitably formed to support a journal box or a bearing housing 11 which while open at its innermost and outermost ends, provides a lubricant containing bearing chamber 12 for properly lubricating tapered roller bearings 13 and 14 suitably secured within the housing 11. The axle or shaft 15 has its journal portion 16 extending into the housing chamber 12 for supporting the bearings 13 and 14, in the usual manner.

The innermost end of the bearing housing 11 is sealed by means of a flexible sealing member 17 of annular form. This member 17 is provided with an enlarged inner flange 18 which closely embraces a backing sleeve 19 and hence the adjacent zone of the axle journal 16. The outer flange 20 of the sealing means 17 is clamped to an adjacent portion of the housing by a backing ring 21 which is, in turn, secured in place by the threaded members 22.

In many applications where the outermost end of the bearing housing 11 is closed by means of a non-flexible or rigid member, the rise in temperature within the housing chamber 12 while in service builds up a pressure within this chamber which greatly exceeds the external or atmospheric pressure. This internal pressure increase is sufficient to force the lubricant through the sealing means 17, and in many cases actually blows out the sealing means. On the other hand, when the bearing mounting is brought to rest and permitted to cool off, the decrease of internal pressure, due to temperature decrease, causes a partial vacuum within the chamber 12. This vacuum creates a sucking condition at the sealing means 17 so that foreign matter, such as contaminated grease, dirt and water, is drawn into the chamber 12 resulting in contamination of the lubricant therein. Repeated cycles of pressure and vacuum in the bearing chamber can cause serious loss of lubricant and an accleration in the wear on the bearings.

The present invention overcomes the above described objections by providing a breather type closure means for the bearing housing 11. Referring to Figs. 1, 2 and 4, the closure means comprises a cap 24 which is mounted by its flange 25 and threaded elements 26 to the outermost end face 27 of the bearing housing 11. This cap 24 provides a space 28 adjacent the lubricant containing chamber 12 of the bearing housing 11. In the preferred construction, the cap space 28 is separated from the housing chamber 12 by means of a flexible diaphragm 29 forming a wall of the housing which effectively closes the outermost end of the chamber 12 and provides a lubricant seal therefor. The flexible diaphragm 29 may be formed from a suitable metal and is provided with a resilient mounting ring 30 which is carried on the periphery of the diaphragm and is mounted in an annular recess 31 formed in the cap 24. The mounting ring 30 for diaphragm 29 may be formed of any suitable resilient material, such as rubber, and may be bonded or otherwise secured to the periphery of the diaphragm as may be found expedient or desirable. The cap 24 is further provided with a breather opening 32 which permits the cap space 28 to communicate with atmosphere.

In the operation of the present improvements, when the pressure within the chamber 12 is equal to the pressure within the cap space 28 the diaphragm 29 assumes its normal unflexed position disclosed in Fig. 4. After a period of operation when the housing has thoroughly heated up and the pressure within chamber 12 has exceeded the pressure in space 28, the diaphragm 29 will flex outwardly to increase the volume of the closed chamber 12 until the internal and external pressures are in equilibrium. This change of volume of chamber 12 occurs since diaphragm 29 is made to flex at a lower pressure than that which is required to move or displace seal 17 from its normal position. On the other hand, when the housing is allowed to cool the contraction of the air and oil vapor is accompanied by a decrease of the pressure within chamber 12. As a result, the greater pressure of the atmosphere in the cap space 28 causes inward flexure of the diaphragm. It is important to note in this connection that the sealing means 17 at the innermost end of the housing 11 is less responsive to forces tending to displace it than is the diaphragm 29, so that the resulting relatively fixed condition of the seal 17 prevents lubricant escape and contamination and is a decided improvement over the sucking in or blowing out reaction of the prior sealing means.

The modification of the sealing means disclosed in connection with Fig. 5 includes the provision of a rubber, or rubber-like diaphragm 34 having a rolled marginal portion 35 seated in the annular recess 31 provided in the closure cap 24. The rolled rim 35 of the diaphragm is held in the recess 31 by means of a resilient snap ring 36 of split type to permit the same to be easily and quickly inserted or removed.

A further modification, illustrated in Fig. 6, shows the modified cap 24a having an annular notched recess 39 for receiving the marginal edge of a diaphragm 40. The diaphragm is suitably held in the notched recess 39 by means of an annular backing ring 41 and a plurality of threaded holding elements 42.

Having now described a preferred embodiment of the present invention and certain modifications thereof, it should be clearly understood that further and additional changes and modifications may be made herein without departing from the spirit and intended scope of the invention defined by the following claims.

What I claim is:

1. A railway car sealed axle bearing mounting comprising a housing having a bearing chamber, an axle projecting into said chamber, a bearing between said axle and housing, a flexible lubricant sealing member surrounding said axle and connected with said housing, said sealing member forming a wall of said bearing chamber and being movable inwardly and outwardly relative to said chamber upon changes of pressure within said chamber, and a flexible diaphragm mounted on said housing to form another wall of said chamber, said diaphragm being located on said housing in position to flex in response to chamber pressure conditions so as to relieve said sealing member of such pressure as will cause it to flex inwardly or outwardly and break the seal at said axle.

2. A railway car axle bearing mounting comprising a housing forming a lubricant containing bearing chamber open at opposite ends, an axle extending into the bearing chamber, a bearing supporting said axle within said chamber, a first flexible closure member for one end of said bearing chamber adapted to embrace said axle and being fixed to said housing in position to move relative to said axle, and a second flexible closure member for the opposite end of said bearing chamber adapted to move to selectively increase and decrease the volume of said chamber in accordance with changes of pressure therein and limit movement of said first member.

3. A bearing mounting comprising a housing structure providing a bearing chamber open at its opposite ends, a removable closure for one end of said chamber forming a space open to atmosphere adjacent said chamber, a flexible diaphragm separating said space from said chamber, said closure having a recess and said diaphragm being disposed in said recess, a bearing in said chamber, an axle supported by said bearing, and an annular sealing member about said axle at the opposite end of said chamber.

4. A bearing mounting comprising a housing structure providing a bearing chamber open at its opposite ends, a removable closure for one end of said chamber forming a space open to atmosphere adjacent said chamber, a flexible diaphragm separating said space from said chamber, said closure having an annular recess and said diaphragm having a rolled margin seated in said recess, a resilient element adapted to engage and removably retain said rolled margin in said recess, a bearing in said chamber, an axle supported by said bearing, and an annular sealing member about said axle at the opposite end of said chamber.

5. A bearing mounting comprising a housing structure providing a bearing chamber open at its opposite ends, a removable closure for one end of said chamber forming a space open to atmosphere adjacent said chamber, a flexible diaphragm separating said space from said chamber, said removable closure having an annular recess and said diaphragm includes a metallic body and a resilient mounting ring engaged in said recess and bonded to the margin of said metallic body, a bearing in said chamber, an axle supported by said bearing, and an annular sealing member about said axle at the opposite end of said chamber.

6. In a bearing mounting for a railway car axle including a housing having an open ended bearing chamber, the improvement of a closure member for the open end of said chamber, said member comprising a cap having an annular recess and a flexible diaphragm formed with a rolled margin seated in said recess to support the same and close said chamber, and a resilient element engageable with and removably retaining said rolled margin in said recess, said cap having an opening to atmosphere at the side of said diaphragm opposite said chamber.

7. In a bearing mounting for a railway car axle including a housing having an open ended bearing chamber, the improvement of a closure member for the open end of said chamber, said member comprising a cap having an annular recess and a flexible diaphragm consisting of a metallic body and a resilient mounting ring engaged in said recess to support the same and close said chamber, said mounting ring being bonded to the margin of said metallic body, and said cap having an opening to atmosphere at the side of said diaphragm opposite said chamber.

References Cited in the file of this patent

UNITED STATES PATENTS

| Number | Name | Date |
|---|---|---|
| 1,954,685 | Stanton | Apr. 10, 1934 |
| 1,959,191 | Acly | May 15, 1934 |
| 2,050,685 | Wiggins | Aug. 11, 1936 |
| 2,430,359 | Messinger | Nov. 4, 1947 |

FOREIGN PATENTS

| Number | Country | Date |
|---|---|---|
| 657,692 | Germany | Mar. 10, 1938 |
| 760,890 | France | Dec. 27, 1933 |
| 855,654 | France | May 17, 1940 |